Patented May 23, 1933

1,910,001

UNITED STATES PATENT OFFICE

ACHILLE CARUGHI AND CARLO PAOLONI, OF BRESCIA, ITALY

PROCESS FOR THE MANUFACTURE OF CHLORIDE OF LIME

No Drawing. Application filed May 11, 1931, Serial No. 536,682, and in Italy March 25, 1931.

It is well known that in the manufacture of chloride of lime through the reaction of chlorine on hydrated lime, the chloride of lime at a certain stage of the chlorination process tends to become wet due to the water yielded by the reaction

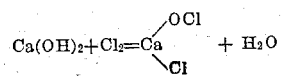

$$Ca(OH)_2 + Cl_2 = Ca\!\!\begin{array}{c}OCl\\Cl\end{array} + H_2O$$

This phenomena especially in mechanical apparatus, causes the chloride of lime to lose its powder form and gives rise to the building of lumps which unite together and cement themselves to one another.

Various means have been tried to overcome this inconvenience such as: extremely slow chlorination, addition of large air volumes, chlorination at low temperatures. Such means, however, achieve the object in view only partially and involve numerous inconveniences.

It is further well known that chloride of lime, when wet and mixed with lumps, is very difficult to dehydrate, chiefly due to the reduced evaporation surface, so that the anhydrous chloride of lime has been thus far hardly obtainable.

By the present invention the method has been found of overcoming the stage at which the chloride of lime gets wetted, of maintaining it constantly in powder state and of obtaining the anhydrous product by means of alternate chlorination and dehydration phases.

If hydrated lime is subjected to chlorination in a discontinuous mechanical apparatus fitted with agitator, the reaction takes place at a first stage without any formation of lumps. Thus with 10% active chlorine, the product is still in dry powder conditions; with 20% instead the product, though still in powder form, yet begins to be wet, and with 25% it is still more wet and small lumps begin to appear. After 30% the building of lumps is considerable and becomes a maximum when the maximum (37–39%) of chlorination is attained, the product being then distinctly wet and partly agglomerated.

With the present invention it has been found that, if one stops chlorinating when the product is still in powder form and, advantageously, when its contents of active chlorine are 25–26%, and a high vacuum is applied, the reaction water that has formed evaporates and is carried off readily, quickly and (which fact is surprising) at a lower temperature than when the product is completely chlorinated.

It has been found that it is not advantageous to remove the whole of the reaction water, otherwise the product would no longer react with the chlorine, but preferably about 4/5 of the water that has formed. After this dehydration, the chlorination is resumed and proceeds in a normal way till the desired maximum titre (37–39%) is reached and, what is most important, preserves its powder form up to the end.

This is due to the fact that a large portion of the water which, if allowed to accumulate, would have entailed the wetting of the product and the formation of lumps, has been removed in due time.

The product obtained by this process is a homogeneous powder, already partly dehydrated and can be directly put on the market as such with the considerable advantage, since it shows a greater stability than the ordinary chloride of lime. If the product, however, is further subjected to high vacuum, due to the chemical and physical special conditions in which it finds itself, it undergoes a complete dehydration without any noteworthy decomposition and supplies an anhydrous, high titre chloride of lime in powder form and stable at high temperatures.

It has further been found that the various chlorination and dehydration stages can be advantageously and alternately performed in a single discontinuous mechanical apparatus fitted with double jacket and with a tubular shaft agitator, both jackets being traversed by circulating hot or cold water in order to adjust the temperatures for the reaction and for the high vacuum dehydration. Of course the various phases follow one another without interruption between each of them and the next.

With this mechanical apparatus, the resulting chloride of lime is of astonishingly heavy weight. The weight per volume unit is always greater than 1, whereas the ordinary chloride of lime only shows a density of 0.5–0.6.

Example 63 parts hydrated lime are subjected, in an apparatus fitted with agitator, to chlorination at a temperature of 40° C., the temperature being adjusted by means of external water circulation. When 25 parts chlorine have been absorbed, that is to say when the product has 28.4% contents of active chlorine, the chlorination is stopped.

At once the high vacuum (15–20 mm. mercury column) is applied, at 40° C. temperature, and about 5 parts water are rapidly evaporated; after this the high vacuum is stopped and the normal chlorination resumed, further 12 parts chlorine being supplied.

The resulting product contains 38% active chlorine and only about 4.4% water.

High vacuum (15–20 mm. merc. col.) is applied again at 46–48° C. and the product is completely dehydrated, 4 parts water being removed and 91 parts anhydrous chloride of lime being obtained, with about 40% active chlorine and an apparent density of 1.15.

The outstanding advantages of the novel process as compared with the lead room system and the various mechanical systems may be briefly recapitulated as follows:

The novel process, permitting a continuous working, makes it possible to carry out the chlorination in an apparatus fitted with stirring arrangement, the complex of which is very simple and wherein the reaction can be completely controlled, just because the temperature can be adjusted at will and the chlorination is performed on the whole amount of lime concerned, thus supplying a perfect and homogeneous product.

With the novel process it is practicable to work on chlorine gas having any chlorine contents.

With the novel process, an anhydrous chloride of lime in the form of a fine powder is directly obtained, the product being stable under the highest equatorial temperatures, whereas this is hardly attainable with other mechanical processes.

The high specific weight of the product permits a valuable saving in packing cost.

Having now particularly described and ascertained the nature of our said invention and in what manner the same is to be performed, we declare that what we claim is:—

1. A process for the manufacture of anhydrous chloride of lime with a high percentage of available chloride, stable and in powder form through the action of chlorine on hydrated lime, which consists in stopping the chlorination when about two-thirds completed, removing about four-fifths of the reaction water by means of high vacuum, thereupon resuming the chlorination and completing the reaction, and finally dehydrating the product by means of a further high vacuum.

2. A process according to claim 1, which consists in carrying out the process in a single discontinuous operation during agitation and performing alternately the chlorination at determined temperatures and the dehydration under a high vacuum.

3. A process according to claim 1, which consists in carrying out the process in a single discontinuous operation in an apparatus fitted with an agitator wherein the chlorination at determined temperatures and dehydration under high vacuum may be alternately performed.

Signed at Milan, Italy, this 24th day of April 1931.

ACHILLE CARUGHI.
CARLO PAOLONI.